(12) United States Patent
Drake et al.

(10) Patent No.: US 8,701,633 B2
(45) Date of Patent: Apr. 22, 2014

(54) METHOD OF FLUID INJECTION

(75) Inventors: Timothy Guy Drake, Shotesham All Saints (GB); Benjamin David Smither, Diss (GB)

(73) Assignee: Robert Bosch GmbH (DE)

( * ) Notice: Subject to any disclaimer, the term of this patent is extended or adjusted under 35 U.S.C. 154(b) by 622 days.

(21) Appl. No.: 13/058,473

(22) PCT Filed: Aug. 13, 2009

(86) PCT No.: PCT/GB2009/001984
§ 371 (c)(1),
(2), (4) Date: May 2, 2011

(87) PCT Pub. No.: WO2010/018377
PCT Pub. Date: Feb. 18, 2010

(65) Prior Publication Data
US 2011/0209688 A1    Sep. 1, 2011

(30) Foreign Application Priority Data
Aug. 15, 2008 (GB) .................................. 0814982.5

(51) Int. Cl.
*F02D 41/40* (2006.01)
*F02D 41/20* (2006.01)

(52) U.S. Cl.
USPC ........................................................ 123/488

(58) Field of Classification Search
CPC . F02D 41/402; F02D 41/182; F02D 41/3094; F02D 2400/06
USPC ......... 123/1 A, 299, 300, 304, 431, 472, 480, 123/488, 491, 575; 701/104, 110, 115
See application file for complete search history.

(56) References Cited

U.S. PATENT DOCUMENTS

| 4,499,878 | A | 2/1985 | Igashira et al. | |
|---|---|---|---|---|
| 4,649,886 | A | 3/1987 | Igashira et al. | |
| 7,617,039 | B2 * | 11/2009 | Allen et al. | 701/110 |
| 7,798,130 | B2 * | 9/2010 | Allen | 123/490 |
| 8,116,962 | B2 * | 2/2012 | Allen et al. | 701/103 |
| 2007/0113829 | A1 | 5/2007 | Allen | |

FOREIGN PATENT DOCUMENTS

| GB | 2421543 A | 6/2006 |
|---|---|---|
| WO | 2008104774 A2 | 9/2008 |
| WO | 2009034342 A2 | 3/2009 |

OTHER PUBLICATIONS

International Search Report, Date of mailing: May 11, 2009, International Application No. PCT/GB2009/001984 (3 pages).

* cited by examiner

*Primary Examiner* — Stephen K Cronin
*Assistant Examiner* — Elizabeth Hadley
(74) *Attorney, Agent, or Firm* — Luedeka Neely Group, PC

(57) ABSTRACT

The present invention relates to a method of operating an internal combustion engine. With reference to FIGS. (1), (2) and (5), fluid is supplied to charge air using an injector (116, 3116*a*, 3116*b*) which in each operation delivers a set amount of fluid. The amount of fluid supplied to the charge air in each engine cycle is controlled by how many times the injector (116, 3116*a*, 3116*b*) operates in each cycle. A desired fluid demand is calculated as a number of operations of the injector per cycle, calculated to at least one decimal place. The desired fluid demand is always rounded down or always rounded up to a near integer to provide an output fluid demand for the injector as a number of operations of the injector for the next operating cycle in varying operating conditions of the engine. The rounding difference is aggregated and when the aggregate passes an integer then the fluid demand is adjusted.

10 Claims, 5 Drawing Sheets

US 8,701,633 B2

METHOD OF FLUID INJECTION

CROSS-REFERENCE TO RELATED APPLICATION

This application claims priority under all applicable rules and statutes to International Application No. PCT/GB2009/001984, filed Aug. 13, 2009, and entitled A METHOD OF FLUID INJECTION, which claims priority to GB 0814982.5, filed Aug. 15, 2008, incorporated herein by reference in their entireties.

This invention relates to a method of operating an internal combustion engine.

Most internal combustion engines in automobiles currently use fuel injection systems to supply fuel to the combustion chambers of the engine. Fuel injection systems have replaced the earlier technology of carburettors because they give better control of the delivery of fuel and enable the engine to meet emission legislation targets as well as improving overall efficiency.

It is important that the fuel injection system delivers an appropriate amount of fuel at an appropriate time. Inappropriate delivery of the fuel may lead to a reduction in the output power of the engine, an increase in emissions and a wastage of fuel.

Whilst the sophisticated and highly developed fuel injection systems currently available are ideal for use in internal combustion engines in automobiles, there are many other applications for internal combustion engines where such a level of sophistication is not appropriate and too costly. For instance, small single cylinder engines as used for a variety of engine powered gardening devices (such as lawn mowers, hedge trimmers, chain saws, rotovators, lawn aerators, scarifiers and shredders), small generators, mopeds, scooters, etc. are built to very tight cost targets and therefore cannot afford the cost of a sophisticated fuel injection system. To date, such small engines have used traditional cheaper carburettor technology. However, small engines of this type will soon face the same kind of exhaust gas emission legislation as automobile engines and so must be modified to meet the emission targets. Therefore, a cheap and simple system of fuel injection is required for such small engines.

In GB 2425188 the applicant described a fuel injection unit suitable for a small engine. The injector described injects in each operation a set amount of fuel into the charge air; the controller of the unit decided in each engine cycle how much fuel was needed and then operated the injector a number of times to come closest to the ideal amount of fuel. Since the amount of fuel can only be controlled in steps equivalent to the volume dispensed by the injector, the control was quite coarse. The engine could be over-fuelled or under-fuelled, where fine control of the fuelling is required.

According to a first aspect of the present invention, there is provided a method of operating an internal combustion engine according to claim 1.

According to a second aspect of the present invention, there is provided a method of operating an internal combustion engine according to claim 6.

Without increasing the complexity or cost of the injection apparatus itself the applicant has devised a way to achieve finer control of the amount of fuel delivered to a combustion chamber in each cycle to improve the efficiency of the engine, its, fuel consumption and its emissions.

Internal combustion engines that make use of embodiments of the invention can do away with complicated, heavy and expensive fuel injection timing systems. Instead, they may make use of a cheaper and simpler system.

Further respective aspects and features of the invention are defined in the appended claims.

Embodiments of the invention will now be described, by way of example only, with reference to the accompanying drawings, in which:

FIG. 1 schematically illustrates a first embodiment of an internal combustion engine having a fuel injection system according to the present invention;

FIG. 2 schematically illustrates a fuel injector for use in the fuel injection system of FIG. 1;

Figure 5:
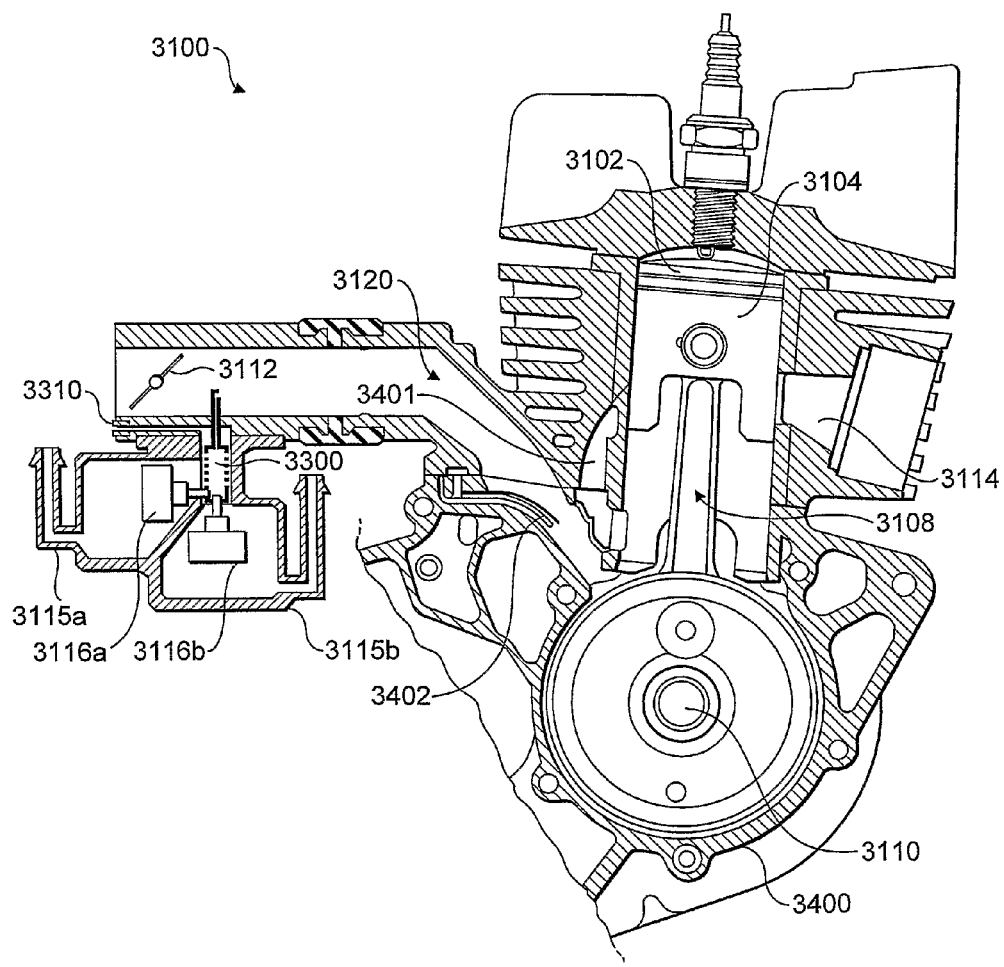

FIG. 5 schematically illustrates a second embodiment of an internal combustion engine having a fuel injection system according to the present invention.

Figure 1:
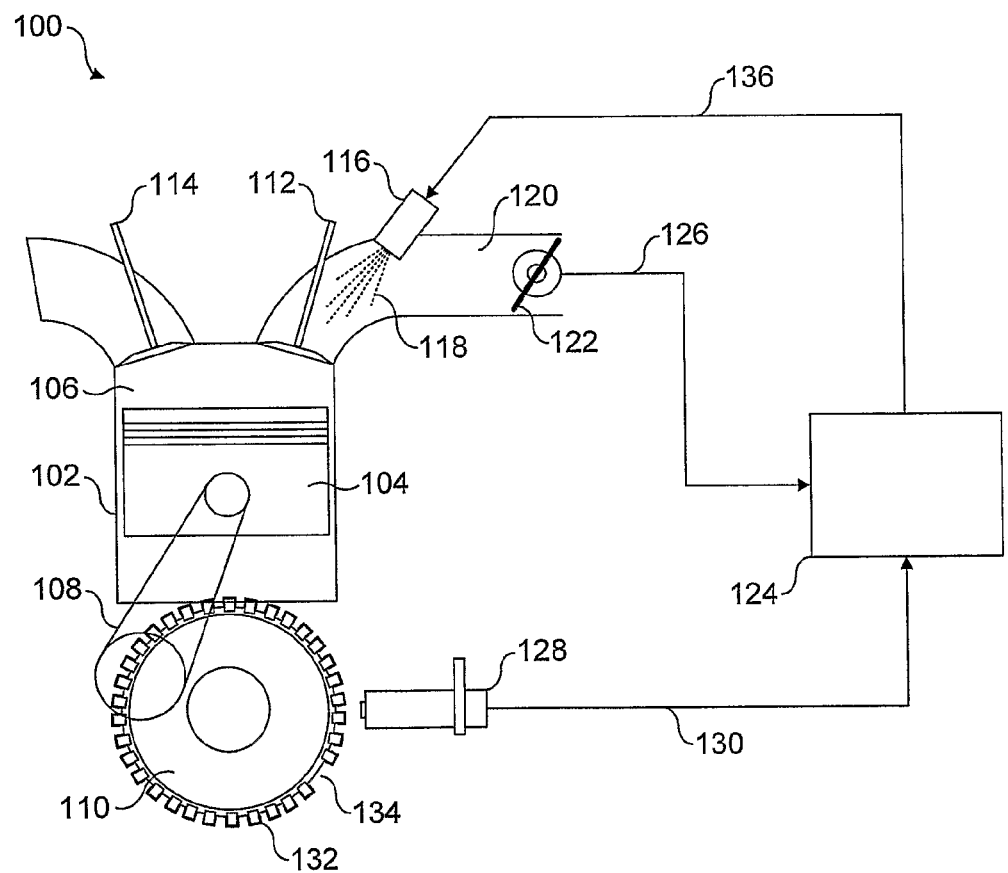

FIG. 1 illustrates an internal combustion engine 100 comprising a cylinder 102 in which reciprocates a piston 104 with the piston 104 and the cylinder 102 defining between them a combustion chamber 106. The piston 104 is connected by a connecting rod 108 to a crankshaft 110. The crankshaft 110 drives a camshaft (not shown) which in turn drives an inlet valve 112 and an exhaust valve 114. The inlet valve 112 and the exhaust valve 114 are driven in timed relationship to the movement of the piston 104 in the cylinder 102, with return springs (not shown) biasing the valves 112, 114 back into their valve seats.

The fuel injection system of the engine 100 comprises a fuel injector 116 arranged to deliver fuel 118 into an inlet passage 120 downstream of the inlet valve 112. A throttle valve 122 is placed in the inlet passage 120 to control the flow of charge air into the inlet passage 120 and the combustion chamber 106.

An engine control unit 124 controls the time at which the fuel 118 is injected into the charge air present in the inlet passage 120 and also controls the quantity of fuel 118 that is injected. The engine control unit 124 receives a signal from the throttle valve 122 via a control line 126, the signal indicating the rotational position of the throttle valve 122 and hence the engine load. Additionally, the engine control unit 124 receives a timing signal from a crankshaft sensor 128 (which could be replaced by a camshaft sensor) via a control line 130. The crankshaft sensor 128 is responsive to teeth 132 on the crankshaft 110 and to a gap 134 in the teeth 132. The engine control unit 124 can determine, from the timing signal received from the crankshaft sensor 128, the speed of the engine 100 and the position of the piston 104 within the cylinder 102, this being used to determine the timing of opening and closing of the inlet valve 112. Having regard to the timing signal produced by the crankshaft sensor 128 and the load signal produced by the sensor attached to the throttle valve 122, the engine control unit 124 generates a control signal which is relayed to the injector 116 via a line 136 and controls the operation of the injector 116.

Figure 2:
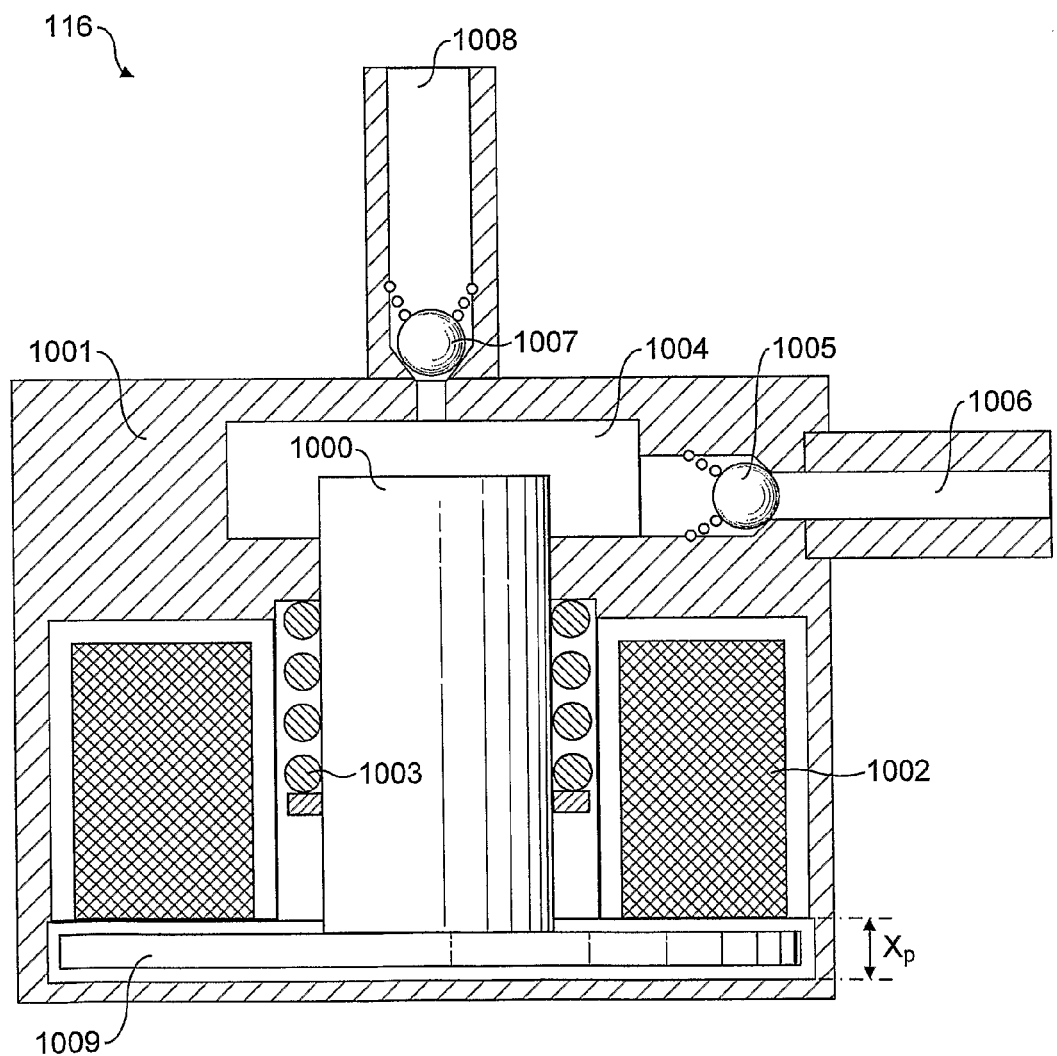

FIG. 2 shows an embodiment of an injector 116. It comprises a piston 1000 slideable in a housing 1001. The piston 1000 is acted upon by a solenoid 1002 and by a biasing valve spring 1003. The piston is moveable to draw fluid into and dispense fluid from a fluid chamber 1004. A one-way inlet valve 1005 allows fluid to flow into the fluid chamber 1004 from a fluid inlet 1006, while preventing flow of fluid out of the fluid chamber 1004 to the fluid inlet 1006. A one-way sprung-loaded outlet valve 1007 allows fluid to be dispensed from the fluid chamber 1004 to a fluid outlet 1008, but prevents fluid being drawn back into the fluid chamber 1004 from the fluid outlet 1008.

In the operation of the fluid injector 116 the activation of the solenoid 1002 moves the piston 1000 against the biasing force of the spring 1003 to displace fluid from the fluid chamber 1004 via the outlet valve 1007 to the fluid outlet 1008. Then, when the solenoid 1002 is de-energised the biasing spring 1003 forces the piston 1000 to move to draw fluid into the fluid chamber 1004 via the inlet valve 1005. The piston 1000 has a defined piston stroke $X_p$. This piston stroke is defined by setting the travel of the piston between two end stops. By setting a definite piston travel the volume of fluid dispensed in each dispensing operation of the fluid injector 116 can be set at a fixed value. Thus, whenever the solenoid 1002 is operated then the fluid injector 116 dispenses a set amount of fluid. This means that in each engine cycle the total amount of fluid dispensed by the fluid injector 116 can be controlled by controlling the number of times that the solenoid 1002 is activated during the engine cycle. Unlike pulse width modulated injectors, the amount of fluid delivered by the fluid injector is insensitive to pressure variations in the intake passage 1006 or outlet passage 1008.

The embodiments described above a four-stroke internal combustion engine, but the fuel injection strategy is also applicable to a two-stroke internal combustion engine. Such an engine can have not only an injector of the type described above to deliver fuel, but also an additional injector of the same type to deliver two-stroke engine oil.

Previously it has been proposed for each engine cycle to take measured engine speed and load and then use a look-up table to determine how many times in the engine cycle a fuel injector 116 should be operated. This was determined separately for each engine cycle, independently of all other engine cycles. However, this gives only a coarse control of the amount of fuel going into the engine for combustion.

The applicant has realised that not all fuel dispensed by the injector 116 prior to a combustion cycle reaches the combustion chamber and is combusted. Instead a significant amount of fuel hangs on the walls of the intake passage 120. This is usually considered undesirable and so the injector 116 is usually situated as near as possible to the back of the valve head of valve 112 to minimise the length of the passage 120 on whose walls fuel can hang.

The applicant has realised that the fact that fuel hangs on walls, normally felt undesirable, can be used to advantage in the use of an injector as described above with reference to FIG. 2. The applicant has designed a new control strategy to be used by the electronic controller 124 of FIG. 1.

Figure 3:
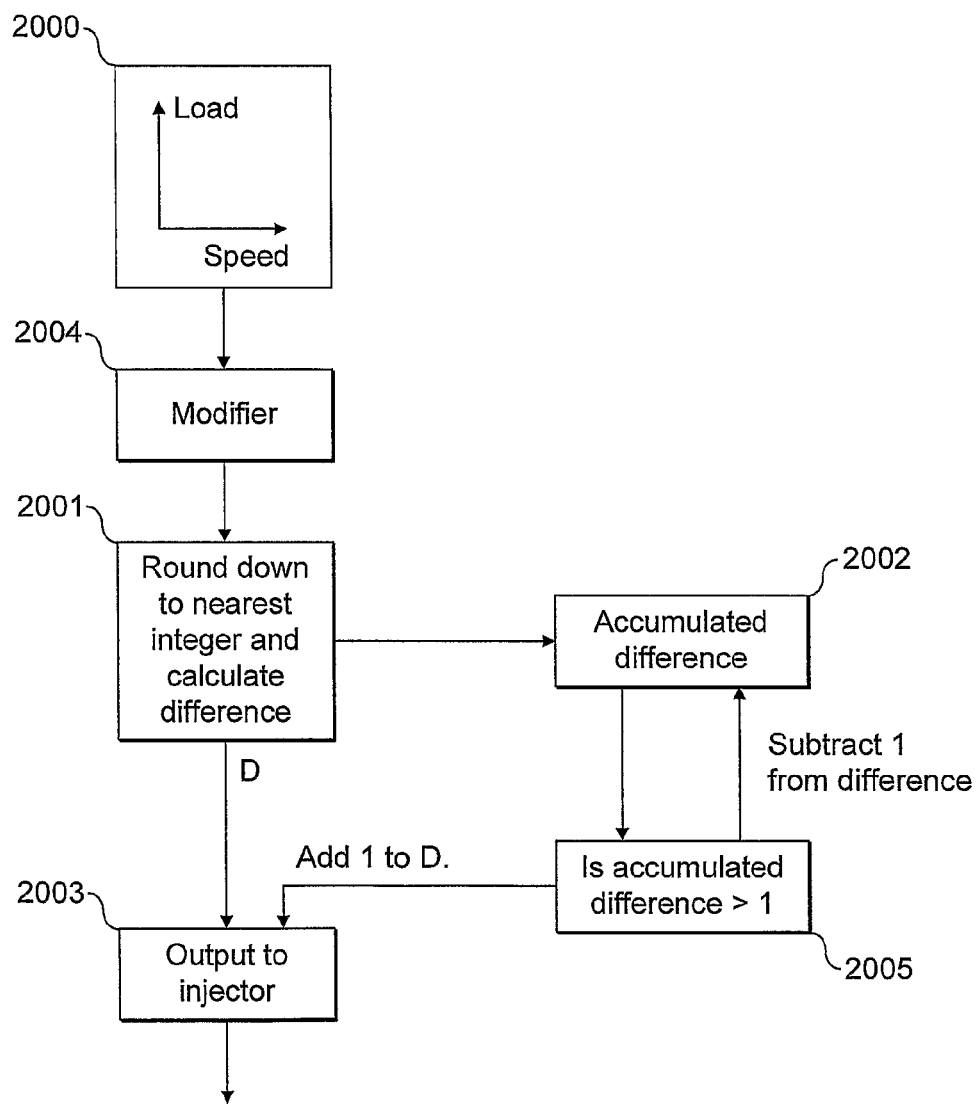
FIG. 3 is a flowchart of a method of operation of the engine control unit illustrated in FIGS. 1 and 2.

The strategy is illustrated by the flow chart of FIG. 3, which shows steps of a first method of the invention used to calculate an optimal integer number of operations of a fluid injector for a single engine cycle.

FIG. 3 illustrates a method of operation according to the present invention. As described in the previous patent GB 2425188, the controller 124 will use measured engine load and speed to address a look-up table at step 2000. This will give an idealised amount of fluid to be delivered by the injector 116 for a single engine cycle. Preferably, this will take place at the beginning of the engine cycle. As an alternative to using a look-up table, this amount of fluid could be calculated each cycle according to a pre-programmed algorithm, e.g., using engine speed and engine load as two input variables.

The controller will receive a measure of the rate of revolution of the engine (rpm) and from the crankshaft position signal will recognise the beginning of each new engine cycle.

This controller can also take account of factors such as changing engine temperature, atmospheric pressure, etc, provided by sensors associated with the engine, although this is optional.

A desired amount of fuel to be delivered is determined as a number of operations of the fluid injector, such number be calculated to one or two decimal places. For instance, a desired fuel demand might be 3.6 operations of the fluid injector. Obviously the injector itself can only operate 3 times a cycle or 4 times a cycle and cannot itself operate 3.6 times a cycle.

At 2001 the fuel demand is rounded down to the nearest integer. For instance, a 3.6 fuel demand would be rounded to 3. This is an output as a demand D. The difference between the output demand D and the input demand calculated at 2000 (or 2004) is determined, in this case +0.6. This difference is output to 2002.

The output demand D is relayed to 2003. At 2003 the final output to the injector is determined.

The difference calculated at 2001 will be accumulated at 2002. Then, at 2005 it is determined whether the accumulated difference is greater than 1. If the accumulated difference is greater than 1, then 1 is added to the number D at box 2003 so that the output from 2003 is D+1, and 1 is subtracted from the accumulated difference stored at box 2002.

The method in FIG. 3 allows an averaging to take place over a number of engine cycles to give a total fluid delivery to the cylinder 102, 3102 which is closer to that determined at the step 2000 than if no differences are accumulated in the process.

The method of FIG. 3 can provide substantially the optimum supply of fuel over a number of engine cycles. There will be no noticeable unevenness in the running of the engine because the effect of the fuel 'hanging' on the walls serves to average the fuel delivered to the combustion chamber in any event.

Although in the method shown in FIG. 3, the fuel demand is rounded down to the nearest whole number (integer) of operations of the fuel injector, it will be apparent to the skilled person that the disclosed method could be modified such that the fuel demand is rounded down to any near integer. The operation of box 2002, which stores the accumulated difference would, of course, be modified accordingly.

For example, the fuel demand, as a number of operations of the fuel injector, could be rounded down to the nearest even integer. In which case, the accumulated difference stored at box 2002 would modify the number D at box 2003 by two, when the accumulated difference is greater than two.

Figure 4:
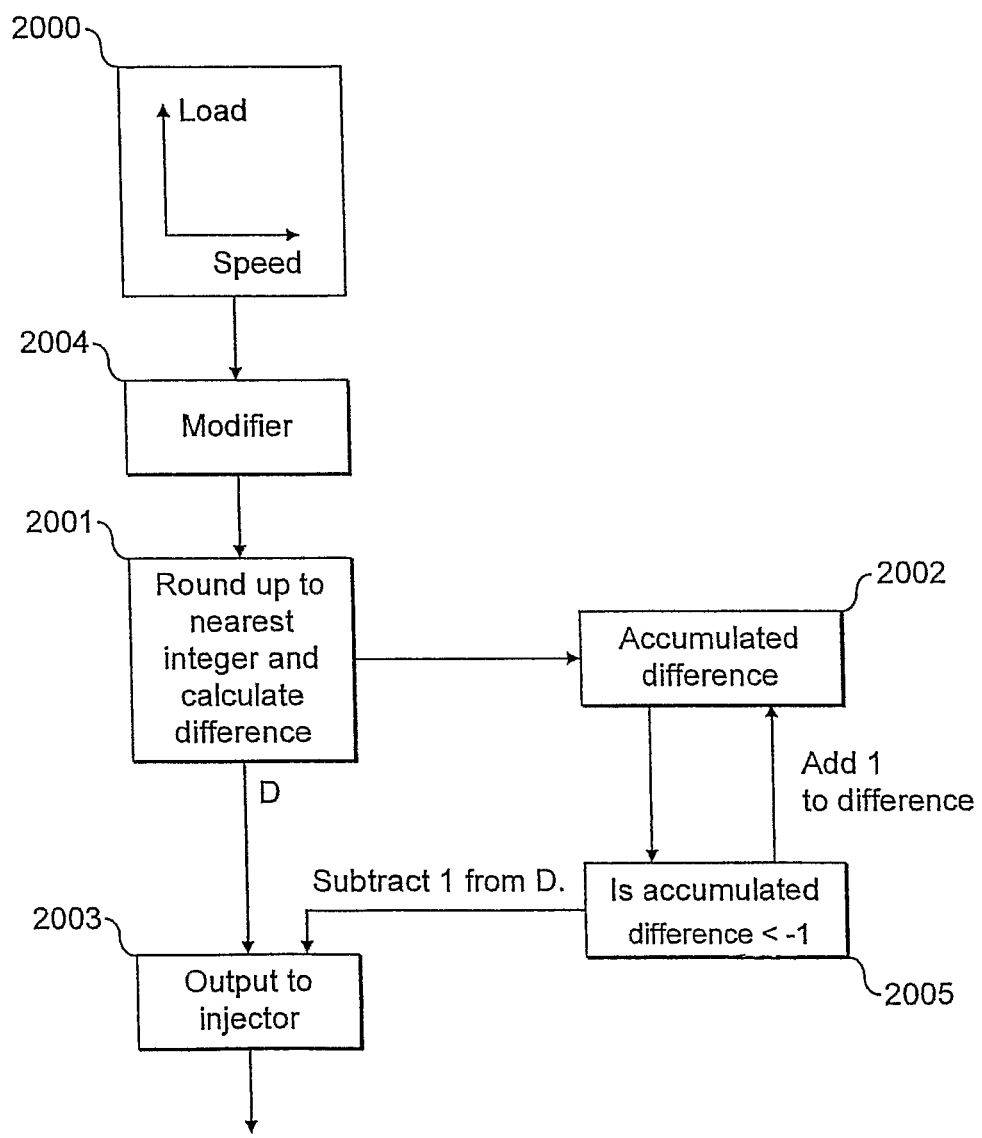
FIG. 4 is a flow chart of a variant of the method of FIG. 3.

In the FIG. 3 method there is a consistent rounding down to a near integer. As an alternative there could be a consistent rounding up to a nearest integer (or near integer, e.g., nearest even integer). This is illustrated in FIG. 4. When the accumulated difference is less than −1 the count D is reduced by 1 and 1 is added to the accumulated difference.

The methods illustrated by the flowcharts of FIGS. 3 and 4 are operated continuously during operation of the engine (and not just in steady state conditions).

FIG. 5 shows a two-stroke internal combustion engine 3100 in accordance with the present invention. The engine comprises a fuel injector 3116a of the type shown in FIG. 2 and also a two-stroke oil injector 3116b, again of the type shown in FIG. 2. Either of the methods disclosed above with reference to FIGS. 3 and 4 can be applied to deliver both fuel and two-stroke engine oil to the engine cylinder.

Engine 3100 is a crank case scavenged two-stroke internal combustion engine comprising a cylinder 3102 in which reciprocates a piston 3104, with the cylinder 3102 and the piston 3104 defining between them a combustion chamber. The piston 3104 is connected by a connecting rod 3108 to a crankshaft 3110.

The operation of engine 3100 is controlled by the electronic controller 124 of FIG. 1.

The fuel injection system of the engine 3100 comprises the first injector 3116a arranged to deliver fuel from a fuel chamber 3115a into an inlet passage 3120 downstream of a throttle valve 3112 and a second injector 3116a arranged to deliver two-stroke engine oil from an oil chamber 3115b into the inlet passage 3120 again downstream of the throttle valve 3112. The delivered fuel and two-stroke oil are both drawn into a crank case 3400 and the mixture of fuel, oil and air in the crank case 3400 is pressurised by downward motion of the piston 3104 with the pressurised mixture then flowing into the combustion chamber via a transfer passage 3401, with a reed valve 3402 preventing flow back up the inlet passage 3120.

The engine 3100 is provided with a mixing chamber 3300 in which the fuel delivered by first injector 3116a and the oil delivered by second injector 3116b are mixed prior to entering the inlet passage 3120. The engine 3100 is provided with air by-pass passage 3310 and air is drawn through the bypass passage 3310 and through the mixing chamber 3300, entraining oil and fuel therein, into the inlet passage 3120 downstream of the throttle valve 3112. A depression downstream of the throttle will draw air through the bypass passage 3310.

In the FIG. 5 engine, the control strategy of FIG. 3 or FIG. 4 is implemented twice; once to calculate the amount of fuel to deliver and once to calculate the amount of oil to deliver. The method associated with FIG. 3 or FIG. 4 is applicable to the delivery of two-stroke oil as well as fuel, although in each engine cycle the total volume of two-stroke engine oil delivered will be smaller than the volume of fuel which is delivered and so the oil injector 3116b will be operated a smaller number of times per engine cycle than the first injector 3116a. Typically the calculated number of operations per cycle of the two-stroke oil injector 3116b will be in the range 0.01 to 0.3 (with 0 operations for an oil free starting condition). Thus the strategy will typically result in one operation of the injector only in each of selected engine cycles (i.e. in some cycles no oil will be injected).

In the FIG. 5 embodiment, electronic controller 124 will carry out the method depicted in FIG. 3 or FIG. 4 for each fluid, fuel and oil, separately. The method may be carried out for each fluid either in parallel or in series.

It will be apparent to the skilled person, that although in the engine 3100 of FIG. 5 the electronic controller 124 applies the method of FIG. 3 or FIG. 4 to control the delivery of two fluids to the cylinder 3102, the above disclosed methods of delivering fluid is applicable to any number of fluids. Whilst the above injection system has been described as delivering either fuel only or both fuel and engine oil, the present invention is also applicable to the delivery of any two fluids, or in fact, any number of fluids. For instance one injector could inject regular gasoline and the other ethanol biofuels (both could be delivered simultaneously in a single engine cycle or the engine operated selectively on either gasoline or biofuel, either in response to driver control or a preprogrammed control strategy).

Whilst the FIG. 2 injector shows the spring 1003 used to move the piston 1000 to draw fluid into chamber 1004 and the solenoid 1002 used to dispense fluid from the chamber 1004, an injector could be used with the operations reversed and a solenoid used to move a piston to draw fluid into a chamber and a spring then used to dispense fluid from the chamber.

The invention claimed is:

1. A method of operating an internal combustion engine comprising the steps of:
    supplying fluid to charge air using an injector which in each operation delivers a set amount of fluid;
    controlling how much fluid is supplied to the charge air in each engine, cycle by controlling how many times the injector operates in each engine cycle;
    determining from engine speed and load a desired fluid demand as a number of operations of the injector calculated to at least one decimal place;
    always rounding the desired fluid demand down to a near integer to provide an output fluid demand for the injector as a number of operations of the injector for the next operating cycle;
    calculating in each engine cycle a difference between the desired fluid demand and the output fluid demand; aggregating the difference over a plurality of engine cycles; and
    when the aggregated difference is equal to or greater than a predetermined value, then for the next engine cycle increasing the output fluid demand for the injector by the predetermined value, and decreasing the aggregated difference by the predetermined value.

2. A method as claimed in claim 1 wherein:
    the step of rounding the desired fluid demand down to a near integer involves rounding the fluid demand down to the nearest integer; and
    the predetermined value is an integer equal to one.

3. A method as claimed in claim 1 including a method step of varying the desired fluid demand with variations in either or both of engine temperature and atmospheric pressure.

4. A method of operating an internal combustion engine comprising the steps of:
    supplying a first liquid to charge air using a first injector which in each operation delivers a set amount of fluid;
    supplying a second liquid to charge air using a second injector which in each operation delivers a set amount of fluid;
    controlling how much first liquid is supplied to the charge air in each engine cycle by controlling how many times the first injector operates in each engine cycle;
    controlling how much second liquid is supplied to the charge air in each engine cycle by controlling how many times the second injector operates in each engine cycle;
    determining from engine speed and load a desired first liquid demand as a number of operations of the first injector calculated to at least one decimal place;
    determining from engine speed and load a desired second liquid demand as a number of operations of the second injector calculated to at least one decimal place;
    always rounding the desired first liquid demand down to a near integer to provide an output first liquid demand for the first injector as a number of operations of the first injector for the next operating cycle;
    always rounding the desired second liquid demand down to a near integer to provide an output second liquid demand for the second injector as a number of operations of the second injector for the next operating cycle;
    calculating in each engine cycle a first difference between the desired first liquid demand and the output first liquid demand;
    calculating in each engine cycle a second difference between the desired second liquid demand and the output second liquid demand;
    aggregating the first difference over a plurality of engine cycles;
    aggregating the second difference over a plurality of engine cycles;
    when the aggregated first difference is equal to or greater than a first predetermined value, then for the next engine cycle increasing the output first liquid demand for the first injector by the first predetermined value, and decreasing the aggregated first difference by the first predetermined value; and when the aggregated second difference is equal to or greater than a second predetermined value, then for the next engine cycle increasing the output second liquid demand for the second injector by the second predetermined value, and decreasing the aggregated second difference by the second predetermined value.

5. A method as claimed in claim 4 wherein:
the first liquid is gasoline fuel; and
the second liquid is lubricating oil.

6. A method of operating an internal combustion engine comprising the steps of:

supplying fluid to charge air using an injector which in each operation delivers a set amount of fluid;

controlling how much fluid is supplied to the charge air in each engine cycle by controlling how many times the injector operates in each engine cycle;

determining from engine speed and load a desired fluid demand as a number of operations of the injector calculated to at least one decimal place;

always rounding the desired fluid demand up to a near integer to provide an output fluid demand for the injector as a number of operations of the injector for the next operating cycle; calculating in each engine cycle a difference between the desired fluid demand and the output fluid demand;

aggregating the difference over the plurality of engine cycles; and when the aggregated difference is equal to or less than a predetermined value, then for the next engine cycle decreasing the output fluid demand for the injector by the predetermined value, and increasing the aggregated difference by the predetermined value.

7. A method as claimed in claim 6 wherein:
the step of rounding the desired fluid demand up to a near integer involves rounding the fluid demand up to the nearest integer; and
the predetermined value is an integer equal to minus one.

8. A method as claimed in claim 6 including a method step of varying the desired fluid demand with variations in either or both of engine temperature and atmospheric pressure.

9. A method of operating an internal combustion engine comprising the steps of:

supplying a first liquid to charge air using a first injector which in each operation delivers a set amount of fluid;

supplying a second liquid to charge air using a second injector which in each operation delivers a set amount of fluid;

controlling how much first liquid is supplied to the charge air in each engine cycle by controlling how many times the first injector operates in each engine cycle;

controlling how much second liquid is supplied to the charge air in each engine cycle by controlling how many times the second injector operates in each engine cycle;

determining from engine speed and load a desired first liquid demand as a number of operations of the first injector calculated to at least one decimal place;

determining from engine speed and load a desired second liquid demand as a number of operations of the second injector calculated to at least one decimal place;

always rounding the desired first liquid demand up to a near integer to provide an output first liquid demand for the first injector as a number of operations of the first injector for the next operating cycle;

always rounding the desired second liquid demand up to a near integer to provide an output second liquid demand for the second injector as a number of operations of the second injector for the next operating cycle;

calculating in each engine cycle a first difference between the desired first liquid demand and the output first liquid demand;

calculating in each engine cycle a second difference between the desired second liquid demand and the output second liquid demand;

aggregating the first difference over the plurality of engine cycles; aggregating the second difference over the plurality of engine cycles;

when the aggregated first difference is equal to or less than a first predetermined value, then for the next engine cycle decreasing the output first liquid demand for the first injector by the first predetermined value, and increasing the aggregated first difference by the first predetermined value; and when the aggregated second difference is equal to or less than a second predetermined value, then for the next engine cycle decreasing the output second liquid demand for the second injector by the second predetermined value, and increasing the aggregated second difference by the second predetermined value.

10. A method as claimed in claim 9 wherein:
the first liquid is gasoline fuel; and the second liquid is lubricating oil.

\* \* \* \* \*